United States Patent
Kim et al.

(10) Patent No.: US 9,632,405 B2
(45) Date of Patent: Apr. 25, 2017

(54) THEATER PARAMETER MANAGEMENT APPARATUS AND METHOD

(71) Applicant: CJ CGV CO., LTD., Seoul (KR)

(72) Inventors: Hwan Chul Kim, Seoul (KR); Su Ryeon Kang, Goyang-si (KR); Ji Hyung Kang, Hwaseong-si (KR)

(73) Assignee: CJ CGV CO., LTD., Seoul (KR)

( * ) Notice: Subject to any disclaimer, the term of this patent is extended or adjusted under 35 U.S.C. 154(b) by 296 days.

(21) Appl. No.: 14/453,992

(22) Filed: Aug. 7, 2014

(65) Prior Publication Data

US 2015/0055096 A1 Feb. 26, 2015

(30) Foreign Application Priority Data

Aug. 26, 2013 (KR) .................. 10-2013-0101353

(51) Int. Cl.
| | | |
|---|---|---|
| *G03B 37/00* | (2006.01) | |
| *G03B 21/14* | (2006.01) | |
| *G03B 35/18* | (2006.01) | |
| *A63J 25/00* | (2009.01) | |
| *G03B 37/04* | (2006.01) | |
| *H04N 9/31* | (2006.01) | |
| *G03B 21/00* | (2006.01) | |

(52) U.S. Cl.
CPC .............. *G03B 35/18* (2013.01); *A63J 25/00* (2013.01); *G03B 21/005* (2013.01); *G03B 37/04* (2013.01); *H04N 9/3147* (2013.01)

(58) Field of Classification Search
CPC ........ G03B 37/00; G03B 35/18; G03B 21/32; G03B 21/147; G03B 21/00
See application file for complete search history.

(56) References Cited

U.S. PATENT DOCUMENTS

| | | | | |
|---|---|---|---|---|
| 6,431,711 B1* | 8/2002 | Pinhanez | ............... | G03B 21/28 348/E5.137 |
| 8,955,984 B2* | 2/2015 | Jung | ..................... | G03B 21/00 353/71 |
| 2004/0150795 A1* | 8/2004 | Ishii | ......................... | G01J 3/51 353/31 |
| 2005/0052623 A1* | 3/2005 | Hsiung | ................. | G03B 21/14 353/94 |
| 2006/0212145 A1 | 9/2006 | Singh et al. | | |

(Continued)

FOREIGN PATENT DOCUMENTS

| | | |
|---|---|---|
| EP | 0751689 A2 | 1/1997 |
| JP | 9326981 A | 12/1997 |

(Continued)

OTHER PUBLICATIONS

Korean Notice of allowance for application No. 10-2013-0101353 dated Jan. 20, 2015.

(Continued)

*Primary Examiner* — William C Dowling
(74) *Attorney, Agent, or Firm* — Hauptman Ham, LLP (57) ABSTRACT

The present invention relates to a theater parameter management apparatus including: a parameter creation unit for creating parameters showing a structure of a theater based on input information; a database for storing the parameters created by the parameter creation unit; and a data processing unit for performing a data processing using the parameters stored in the database.

17 Claims, 7 Drawing Sheets

(56) References Cited

U.S. PATENT DOCUMENTS

| | | | | |
|---|---|---|---|---|
| 2010/0309391 A1* | 12/2010 | Plut | ................... | H04N 9/3147 |
| | | | | 348/756 |
| 2011/0310354 A1 | 12/2011 | Fujimori et al. | | |
| 2013/0173327 A1 | 7/2013 | Lance et al. | | |
| 2015/0261497 A1* | 9/2015 | Poulad | ................. | G03B 21/145 |
| | | | | 353/28 |
| 2015/0296191 A1* | 10/2015 | Kim | ................... | G03B 21/14 |
| | | | | 353/30 |

FOREIGN PATENT DOCUMENTS

| | | | |
|---|---|---|---|
| JP | 200161121 A | 3/2001 | |
| JP | 2003333611 A | 11/2003 | |
| JP | 200694458 A | 4/2006 | |
| JP | 2008288714 A | 11/2008 | |
| JP | 200969728 A | 4/2009 | |
| JP | 2011133746 A | 7/2011 | |
| JP | 2011244044 A | 12/2011 | |
| KR | 1020120020793 A | 3/2012 | |
| KR | 1020130043300 A | 4/2013 | |
| WO | 0278396 A2 | 3/2002 | |
| WO | 2006077665 A | 7/2006 | |

OTHER PUBLICATIONS

International Search Report for PCT/KR2014/007575 dated Nov. 26, 2014.
Japanese Office Action dated Mar. 29, 2016 in connection with the counterpart Japanese Patent Application No. 2014-170807.

* cited by examiner

<Front view of theater>

Fig. 9

<Side view of theater>

THEATER PARAMETER MANAGEMENT APPARATUS AND METHOD

CROSS REFERENCE TO RELATED APPLICATION

This application claims the priority of Korean Patent Application No. 10-2013-0101353, filed on Aug. 26, 2013 in the KIPO (Korean Intellectual Property Office), which is incorporated herein by reference in its entirety.

TECHNICAL FIELD

The present invention relates to a theater parameter management apparatus and method, and more specifically, to a theater parameter management apparatus and method, which can create parameters related to the structure or characteristics of a theater and utilize the created parameters in a data processing procedure (e.g., image correction, simulation of a view of showing an image or the like) related to operation of a multi-projection system.

BACKGROUND ART

Conventionally, in order to play back an image such as a movie, advertisement or the like in a theater, a two-dimensional image is projected on a single screen placed on the front side of the theater. However, the audience has no choice but to watch only the two-dimensional (2D) image in such a system.

Recently, techniques related to 3D images have been developed to provide images having a sense of depth to the audience, and the 3D image techniques use a principle of feeling a sense of depth even from a planar image if different images respectively enter left and right eyes of a person and merge together in the brain, in which two cameras having different polarized light filters are used when an image is taken, and a user wears glasses or the like having polarized light filters when watching the image so that different images may enter the left and right eyes.

However, although the 3D technique may provide an image having a sense of depth to a user, there is a limit in that it is difficult to be absorbed in the image itself since it is merely watching an image played back on a single screen. In addition, there is also a limit in that the direction of the sense of depth felt by the audience is restricted to the direction where the single screen exists. In addition, since the conventional 3D technique requires the audience to wear glasses or the like having polarized light filters when watching an image, it is inconvenient for the audience who watch the image, and since different images are artificially and forcibly injected into the left and right eyes, sensitive audience may feel dizzy or nausea.

Accordingly, a so-called 'multi-projection system' which can solve the problems of the conventional projection system based on a single screen has been proposed, and the 'multi-projection system' mentioned here means a technique capable of providing a sense of depth and a sense of immersion to the audience by arranging a plurality of projection surfaces around the audience seats and playing back an image having a sense of unity on the plurality of projection surfaces.

Meanwhile, in order to efficiently perform a data processing operation (e.g., image correction, simulation of a view of showing an image or the like) related to the operation of the 'multi-projection system', a technique of creating information on the 'structure of a theater' and utilizing the information for data processing is needed. It is since that because the 'multi-projection system' should implement a plurality of projection surfaces unlike a conventional projection system which includes only a single projection surface, the system should be constructed in a different form according to the 'structure of a theater' and should perform a different data processing operation (e.g., image correction, simulation of a state of showing an image or the like) according to the 'structure of a theater'.

However, in a conventional projection system installing only a single screen, such a technique does not exist.

Accordingly, in relation to the operation of the 'multi-projection system', a technique capable of creating information related to the structure of a theater and utilizing the created information for a variety of data processing operations is required.

DISCLOSURE OF INVENTION

Technical Problem

Therefore, the present invention has been made in view of the above problems, and it is an object of the present invention to create parameters related to the structure or characteristics of a theater and utilize the created parameters in a data processing procedure.

Another object of the present invention is to perform a data processing operation (e.g., an image processing process, simulation of a view of showing an image or the like) related to the operation of a multi-projection system based on the parameters showing the structure or characteristics of a theater.

Technical Solution

To accomplish the above objects, according to one aspect of the present invention, there is provided a theater parameter management apparatus including: a parameter creation unit for creating parameters showing a structure of a theater based on input information; a database for storing the parameters created by the parameter creation unit; and a data processing unit for performing a data processing using the parameters stored in the database.

In addition, the theater is a multi-projection theater for providing images through a plurality of projection surfaces, and the data processing unit creates or corrects the images to be played back on the plurality of projection surfaces using the parameters stored in the database.

In addition, the theater is a multi-projection theater for providing images through a plurality of projection surfaces, and the data processing unit simulates a view of providing the images through the plurality of projection surfaces using the parameters stored in the database.

In addition, the plurality of projection surfaces includes a main screen and structure surfaces.

In addition, the parameter creation unit creates a parameter showing a size of the theater, a parameter showing arrangement of a main screen, a parameter showing arrangement of audience seats, or a parameter showing arrangement of projectors.

In addition, the parameter showing a size of the theater includes a parameter showing a width of the theater, a parameter showing a height of the theater, and a parameter showing a depth of the theater.

In addition, the parameter showing arrangement of a main screen includes a parameter showing a ratio of the main screen, a parameter showing a screen top offset of the main screen, a parameter showing a screen left offset of the main screen, and a parameter showing a screen right offset of the main screen.

In addition, the parameter showing arrangement of audience seats includes a parameter showing a front depth of the audience seats, a parameter showing a rear depth of the audience seats, and a parameter showing a rear height of the audience seats.

In addition, the parameter showing arrangement of the projectors includes a parameter showing the number of projectors arranged in a first row, a parameter showing the number of projectors arranged in a second row, a parameter showing the number of projectors arranged in a third row, and a parameter showing the number of projectors arranged in a fourth row.

In addition, the parameter creation unit creates parameters showing a material or a color of a projection surface.

In addition, the data processing unit corrects an image projected on the main screen or an image projected on a structure surface considering information on difference of color or difference of material between the main screen and the structure surface.

In addition, the data processing unit corrects images projected on structure surfaces considering difference of color or difference of material between the structure surfaces.

In addition, the input information is information transferred from a scanner, information transferred from a camera or information transferred from an input device.

In addition, the scanner scans a physical structure of the theater using laser, X-ray, white light or infrared light.

According to another aspect of the present invention, there is provided a theater parameter management method including the steps of: (a) receiving information related to a structure of a theater by a theater parameter management apparatus; (b) creating parameters showing the structure of the theater based on the input information by the theater parameter management apparatus; (c) storing the created parameters by the theater parameter management apparatus; and (d) performing a data processing using the stored parameters by the theater parameter management apparatus.

In addition, after being implemented in the form of a program, the theater parameter management method can be recorded in a recoding medium that can be read by an electronic device.

Advantageous Effects

The present invention may create parameters showing the structure or characteristics of a theater related to construction of a multi-projection system. Accordingly, a data processing operation (e.g., image correction, simulation of a state of showing an image or the like) related to the operation of the multi-projection system can be effectively performed based on the parameters created like this.

Furthermore, the present invention may standardize and quantify the information related to construction of a multi-projection system based on the created parameters. Accordingly, the present invention may generally manage a plurality of multi-projection theaters in which a multi-projection system is constructed based on the parameters and create and correct an image to be played back in each multi-projection theater from a remote site.

Furthermore, the present invention may create parameters showing the structure or characteristics of a theater while being connected to a scanner, a camera and the like. Accordingly, accuracy of the created parameters can be improved, and accuracy of data processing (simulation, image processing and the like) based on the parameters also can be improved.

Furthermore, the present invention may recognize characteristics of each projection surface based on the created parameters and correct an image in a form optimized to each projection surface based on the recognized information. Accordingly, an image of a high sense of immersion can be implemented on each projection surface.

Furthermore, the present invention may recognize a relative difference of characteristics in a plurality of projection surfaces based on the created parameters and perform an image correction process in a direction of offsetting the recognized difference of characteristics. Accordingly, a sense of difference of the images played back on a plurality of projection surfaces can be reduced through such data processing.

Furthermore, the present invention may reflect the real structure and characteristics of a theater in the data processing procedure of a simulation as is based on the created parameters. Accordingly, a view of playing back specific image contents in a specific multi-projection theater can be simulated (simulation of predicting a state of showing an image) with maximized accuracy.

DESCRIPTION OF SYMBOLS

| | |
|---|---|
| 100: Theater parameter management apparatus | |
| 110: Parameter creation unit | 130: Database |
| 150: Data processing unit | 170: Communication unit |
| 210: Input device | 220: Scanner |
| 230: Camera | |
| 131: Theater size parameter DB | |
| 132: Main screen arrangement parameter DB | |
| 133: Seat arrangement parameter DB | |
| 134: Projector arrangement parameter DB | |
| 135: Projection surface material parameter DB | |
| 136: Projection surface color parameter DB | |

BEST MODE FOR CARRYING OUT THE INVENTION

Hereinafter, a 'theater parameter management apparatus and method' according to embodiments of the present invention will be described in detail with reference to the accompanying drawings. The described embodiments are provided to make the technical spirits of the present invention easily understood by those skilled in the art, and the present invention is not limited thereby. In addition, the elements expressed in the accompanying drawings are figures drawn to easily explain the embodiments of the present invention and may be different from actually implemented forms.

Meanwhile, the components expressed below are merely examples for implementing the present invention. Accordingly, other components can be used in other implements of the present invention without departing from the spirits and scope of the present invention. In addition, although each component can be implemented only in a pure hardware or software configuration, it also can be implemented by combining various hardware or software configurations performing the same function.

In addition, the expression of 'including' an element is an 'expression of an open type' which merely refers to existence of a corresponding component, and it should not be construed as precluding additional components.

When a component is referred to as being 'connected' or 'coupled' to another component, it may be directly connected or coupled to the other component, but it should be understood that intervening other component may exist.

Hereinafter, a 'multi-projection system', which is the basis of the present invention, is briefly described, and then the present invention is described in detail.

A multi-projection system, which is the basis of the present invention, means a technique capable of providing images synchronized with each other through a plurality of projection surfaces installed in a single-screen theater and maximizing a sense of reality, a sense of depth and a sense of immersion that the audience may feel from the image in such an environment. That is, the multi-projection system means a system capable of installing a plurality of projection surfaces in a single-screen theater and providing a synchronized image to the audience through the plurality of projection surfaces.

The plurality of projection surfaces is multiple projection surfaces installed in a single-screen theater for multi-projection. A plurality of images is played back on the plurality of projection surfaces, and, here, the images played back on the plurality of projection surfaces are preferably synchronized with each other and form an image having a sense of unity as a whole. That is, although a different image can be played back on each of the projection surfaces, it is preferable to associate the images on the projection surfaces and form an image having a sense of unity from the overall view of the plurality of projection surfaces.

In addition, the plurality of projection surfaces may be arranged not to be parallel to each other. A conventional technique is a method of projecting an image only on a screen arranged on the front side of a theater so that the audience may watch the image played back on a two-dimensional screen or a method of applying a 3D technique to an image itself played back on a plane, whereas, in contrast to the conventional technique, the multi-projection system, which is the basis of the present invention, arranges a plurality of projection surfaces three-dimensionally and not to be parallel to each other so that a sense of depth and a sense of immersion may be provided to the audience through the plurality of three-dimensionally arranged projection surfaces although a 3D technique or the like is not applied to the image itself.

In addition, the plurality of projection surfaces is preferably arranged in a form surrounding the audience seats in the theater. Accordingly, the audience may feel surrounded within a space created by an image, through the image having a sense of unity implemented through the plurality of projection surfaces, and, accordingly, a sense of depth, a sense of immersion and a sense of virtual reality felt by the audience can be maximized.

In addition, an angle created by the plurality of projection surfaces is not limited to a specific angle, and the projection surfaces can be arranged at a variety of angles as long as the audience feels a sense of depth.

In addition, although the plurality of projection surfaces can be arranged in a form combined and adjacent to each other or in a form spaced apart from each other, it is preferable even in this case to arrange the plurality of projection surfaces in a form surrounding the audience seats (in a form opposing the audience seats).

Figure 1:
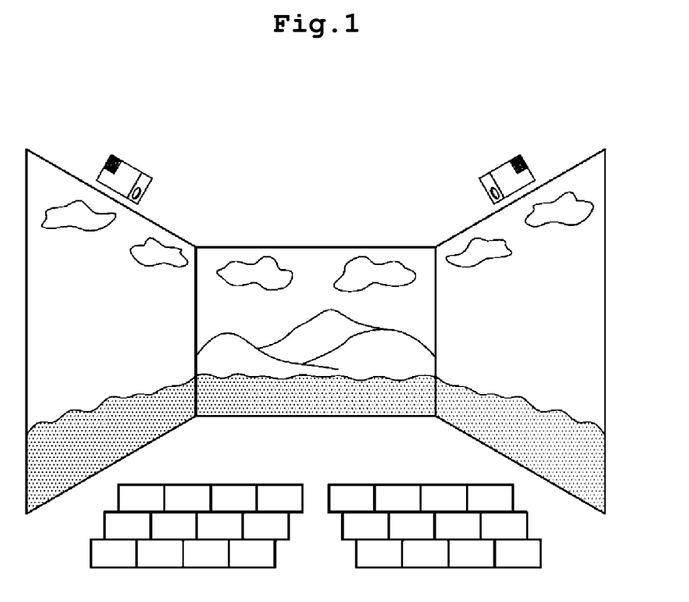
FIGS. 1 to 3 are views showing examples of a theater in which a multi-projection system is constructed.
Figure 2:
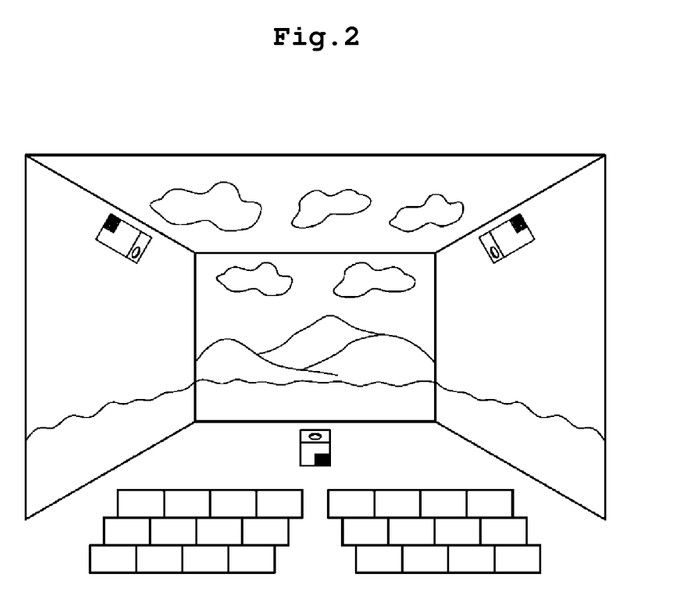
Figure 3:
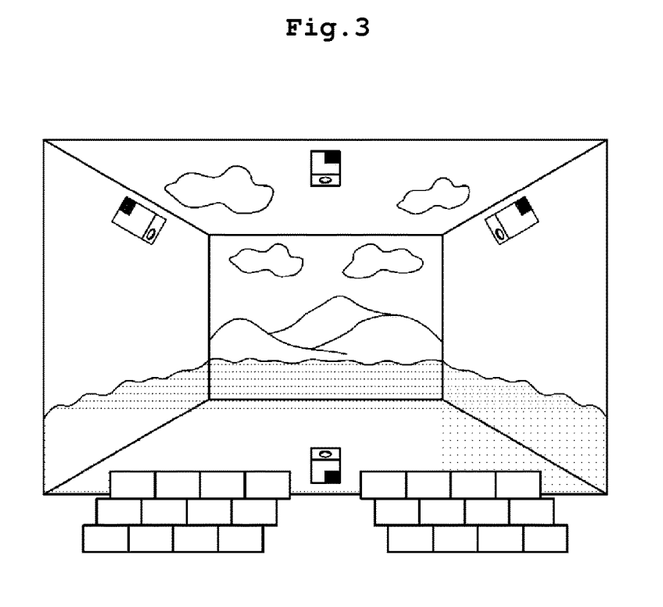

The view shown in FIG. 1 is an embodiment of arranging the plurality of projection surfaces on the front, left and right sides from the viewpoint of the audience seats, and the view shown in FIG. 2 is an embodiment of arranging the plurality of projection surfaces on the front, left, right and top sides from the viewpoint of the audience seats. In addition, the view shown in FIG. 3 is an embodiment of arranging the plurality of projection surfaces on the front, left, right, top and bottom sides from the viewpoint of the audience seats.

In addition, the plurality of projection surfaces can be configured of various kinds projection surfaces such as a screen, a structure surface (a wall, a bottom, a ceiling or the like) and the like and may include different kinds of projection surfaces at the same time.

In addition, the images projected on the plurality of projection surfaces can be projected by two or more projectors installed in a theater, and the two or more projectors can be implemented in a variety of ways in a form including an optical system and a heat generating unit. For example, the projectors can be implemented through a method using a Cathode Ray Tube (CRT), a method using a Liquid Crystal Display (LCD), a Digital Light Processing (DLP) method using a Digital Micromirror Device (DMD) chip, a Liquid Crystal on Silicon (LcoS) method or the like, and it can be implemented in a variety of ways other than these methods. In addition, the two or more projectors can be integratedly controlled by a theater management apparatus (e.g., a theater management server) after being electrically connected to the theater management apparatus and may project images on the plurality of projection surfaces under the control of the theater management apparatus.

Hereinafter, a theater parameter management apparatus 100 according to an embodiment of the present invention will be described with reference to FIGS. 4 to 12.

Figure 4:
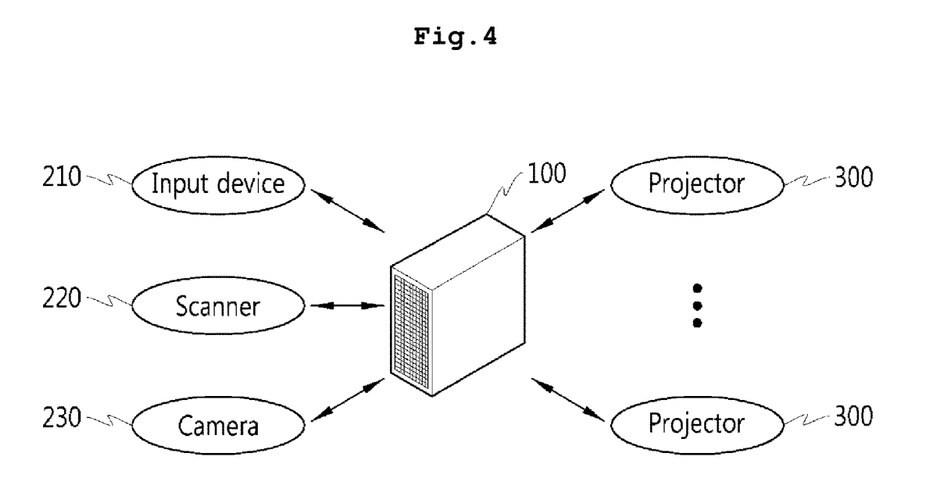
FIG. 4 is a view showing an example of interconnecting a theater parameter management apparatus to other devices according to an embodiment of the present invention.

Referring to FIG. 4, a theater parameter management apparatus 100 according to an embodiment of the present invention may be wiredly or wirelessly connected to an input device 210, a scanner 220, a camera 230 and the like and may create parameters showing the structure or the structure or characteristics of a theater while being connected to these devices. Specifically, the theater parameter management apparatus 100 may receive various forms of information (images, digits and the like) created by the input device 210, the scanner 220, the camera 230 and the like, analyze and process the received information, and create parameters showing the structure or characteristics of a theater through such a procedure.

Here, the input device 210 is a device for receiving information from a user and can be implemented in a variety of devices including a keyboard, a keypad, a touch screen and the like.

In addition, the scanner 220 is a device for measuring and recognizing a physical structure of a theater using a variety of scanning means such as laser, X-ray, white light, infrared light and the like, converting the measured and recognized information into a data form that can be read by an electronic device, and transmitting the converted data.

In addition, the camera 230 is a device for photographing the internal structure of a theater from a plurality of directions, creating a plurality of image data based on the photographing action, and transmitting the created image data.

Meanwhile, the theater parameter management apparatus 100 may compositely utilize the information transmitted from the input device 210, the scanner 220 and the camera 230 in the process of creating parameters and may further improve accuracy of creation of parameters through the information.

In addition, in some embodiments, the theater parameter management apparatus 100 may be configured together with the input device 210, the scanner 220 and the camera 230 in one piece.

In addition, referring to FIG. 4, the theater parameter management apparatus 100 according to an embodiment of the present invention may be wiredly or wirelessly connected to a plurality of projectors 300 and perform a data processing operation (e.g., an image processing operation) using the parameters while being connected to the projectors 300.

Here, although the theater parameter management apparatus 100 can be connected to projectors installed in a 'single-screen theater', preferably, it can be connected to projectors installed in a 'plurality of theaters' (for reference, in this case, the 'connection' does not mean only a direct connection through a wired or wireless means, but is a concept including indirect connections through a server, a relay or the like). In addition, if the theater parameter management apparatus 100 is connected to the 'plurality of theaters', it may create and correct an image for each of the theaters using the parameters created for each theater and transmit the created and corrected image to each of the theaters.

Meanwhile, although the 'plurality of theaters' may be a theater in which a 'projection system of a single projection surface' is constructed, preferably, it can be a theater in which the 'multi-projection system' described above is constructed.

In addition, although it is not shown in detail in FIG. 4, the theater parameter management apparatus 100 according to an embodiment of the present invention may be wiredly or wirelessly connected to a user terminal (a PC, a tablet, a mobile device or the like) or may be configured in a form provided with a display device (a display device or the like) of its own, and it may perform a variety of data processing operations using the parameters in such a state.

For example, the theater parameter management apparatus 100 according to an embodiment of the present invention may predict and simulate various views of projecting images in a variety of theaters using the created parameters (e.g., a view of playing back single image contents at different theaters, a view of playing back different image contents at a single theater, and the like) and visually provide a result of the simulation through the user terminal or the display device.

Hereinafter, the configuration of the theater parameter management apparatus 100 according to an embodiment of the present invention will be described with reference to FIG. 5.

Figure 5:
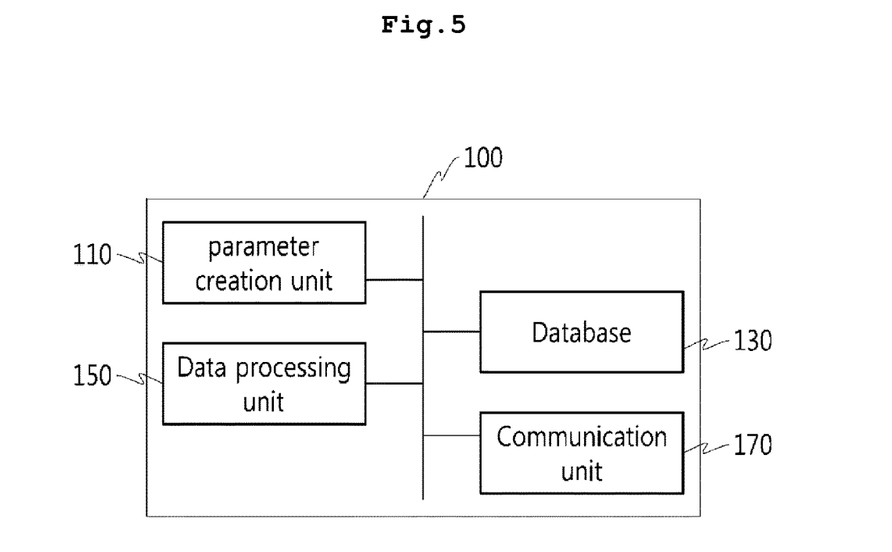
FIG. 5 is a view showing the configuration of a theater parameter management apparatus according to an embodiment of the present invention.

Referring to FIG. 5, the theater parameter management apparatus 100 according to an embodiment of the present invention may include a parameter creation unit 110 for creating parameters showing the structure and characteristics of a theater based on input information, a database 130 for storing the parameters created by the parameter creation unit, a data processing unit 150 for performing a data processing using the parameters stored in the database, and a wired or wireless communication unit 170 for transmitting and receiving data to and from other devices.

The parameter creation unit 110 is a configuration for creating parameters showing the structure and characteristics of a theater based on input information. Specifically, the parameter creation unit 110 may create various parameters related to the structure and characteristics of a theater, including a parameter showing a size of a theater, a parameter showing arrangement of a main screen, a parameter showing arrangement of audience seats, a parameter showing arrangement of projectors, a parameter showing a material of a projection surface, a parameter showing a color of a projection surface, a parameter showing a projection position of a scope image and the like.

Figure 7:
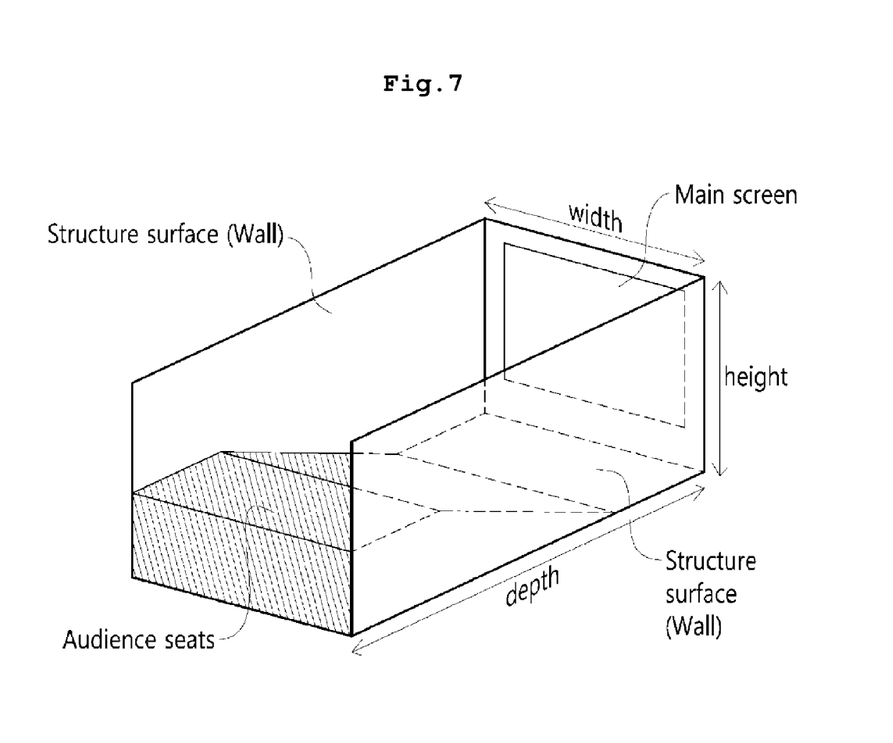
FIGS. 7 to 12 are views showing examples of parameters that can be managed by a theater parameter management apparatus according to an embodiment of the present invention.
Figure 8:
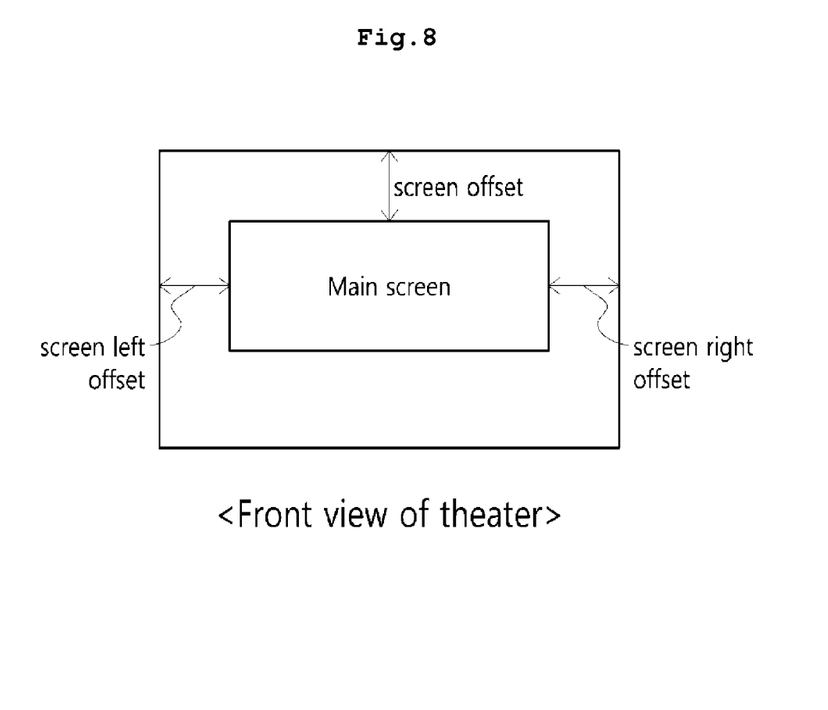
Figure 9:
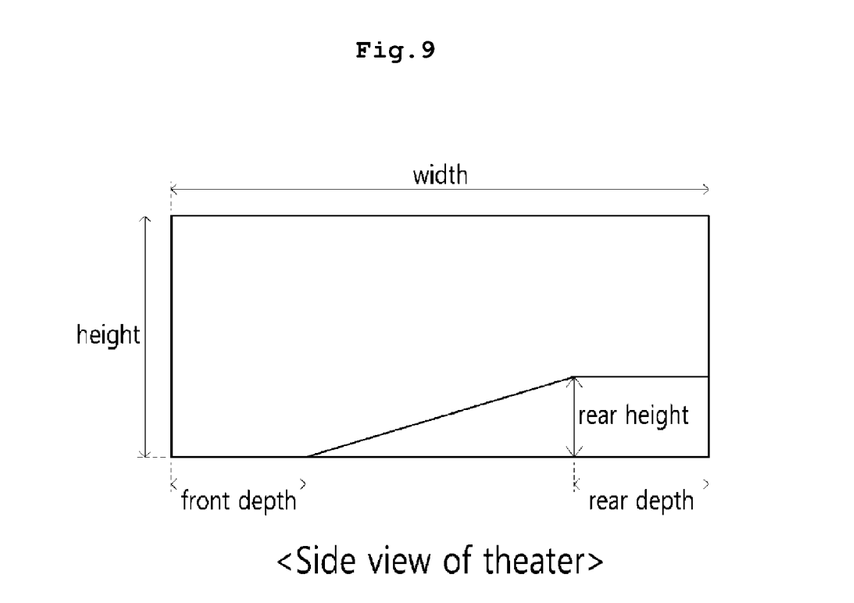

The 'parameter showing a size of a theater' is a parameter for expressing the overall structure or size of a theater. Such a 'parameter showing a size of a theater' may be configured differently depending on whether or not the structure of the theater is a standard structure, and, here, the standard structure means that a structure of a theater is formed in a structure similar to a rectangular box as shown in FIG. 7.

First, if the structure of a theater is a standard structure, the 'parameter showing a size of a theater' may be configured in a form including only a parameter showing the width of the theater, a parameter showing the height of the theater, and a parameter showing the depth of the theater. It is since that because the overall structure of the theater is in a shape of a rectangular box, the entire size of the theater and the size of each structure surface (the front side, the left side, the right side, the ceiling and the like) can be specified by the three parameters. For reference, these parameters can be confirmed through FIG. 7.

Figure 12:
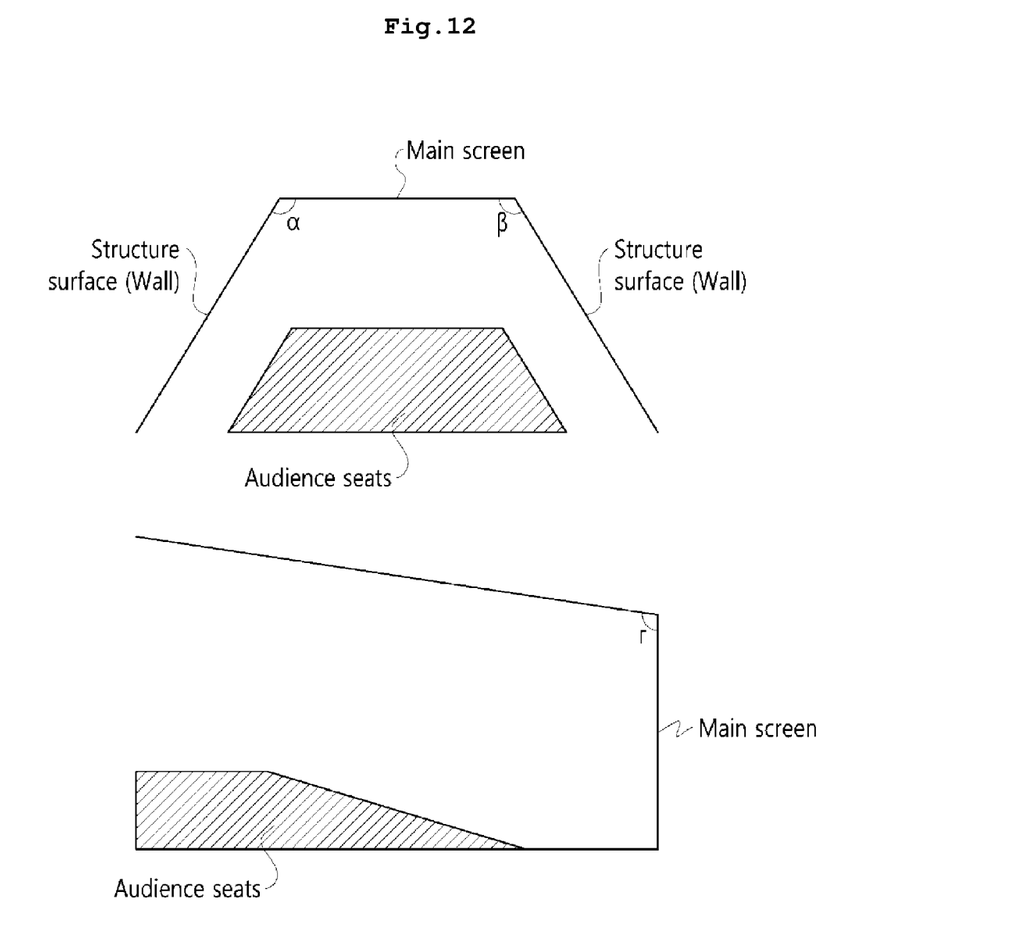

Next, if the structure of a theater is not a standard structure, the 'parameter showing a size of a theater' may be configured in a form including a parameter showing the shape of each structure surface, a parameter showing the individual size of each structure surface, and a parameter showing angles between the structure surfaces. It is since that if the structure of a theater is not a standard structure, each structure surface may be formed in a shape other than a rectangle, and the angles between the structure surfaces may not be a right angle, and thus the individual shape and size of each structure surface and the angles between the structure surfaces should be specified in order to identify the overall structure or size of the theater. Referring to FIG. 12, an example of a theater of a non-standard structure is shown. In this case, the 'parameter showing a size of a theater' may include a parameter showing a shape (a rectangle, a trapezoid or the like) of each structure surface, a parameter showing a size (a length of a segment, an area or the like) of each structure surface, a parameter showing angles ($\alpha$, $\beta$, $\gamma$) between the structure surfaces and the like.

The 'parameter showing arrangement of a main screen' is preferably a parameter for expressing an arrangement state of a main screen installed on the front side of a theater. As is confirmed in FIG. 8, the 'parameter showing arrangement of a main screen' may be configured in a form including a parameter showing the ratio of the main screen, a parameter showing the screen top offset of the main screen, a parameter showing the screen left offset of the main screen, and a parameter showing the screen right offset of the main screen, and the arrangement state and the size of the main screen can be specified through these parameters.

The 'parameter showing arrangement of audience seats' is a parameter for expressing a state of arranging audience seats with respect to the left and right side walls. As is confirmed in FIG. 9, the 'parameter showing arrangement of audience seats' may include a parameter showing the front depth of the audience seats, a parameter showing the rear depth of the audience seats, and a parameter showing the rear height of the audience seats, and the state of arranging the seats can be specified through these parameters. Meanwhile, the 'parameter showing arrangement of audience seats' can be individually created for the left and right side walls or created in the form of a common parameter.

Figure 11:
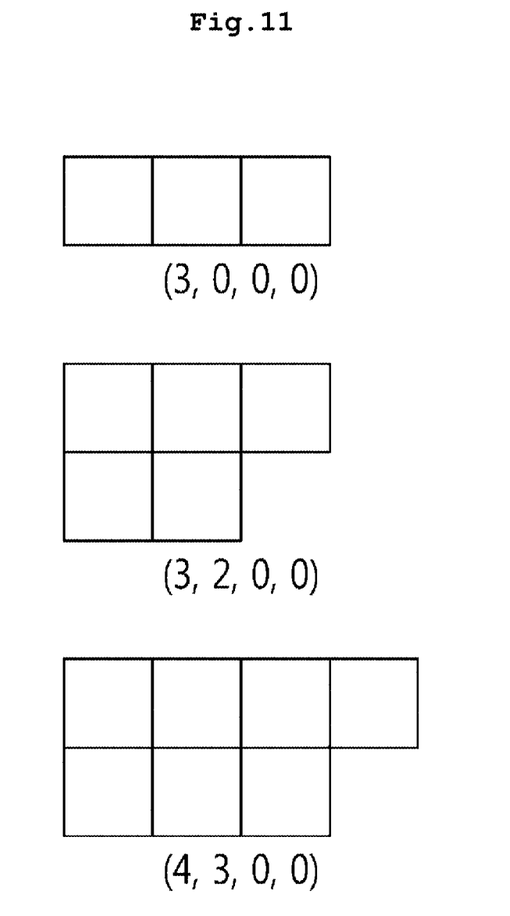

The 'parameter showing arrangement of projectors' is a parameter for expressing a state of arranging projectors installed in a theater. The 'parameter showing arrangement of projectors' can be individually created for each projection surface (the main screen, a structure surface or the like) and may show information on the number of rows of projector groups arranged on a specific projection surface and the number of projectors arranged in each row. FIG. 11 shows a parameter structure using 4-row arrangement as a basic structure (most of the projection surfaces can be covered by the 4-row arrangement if a general size of a theater is considered). In this case, the 'parameter showing arrangement of projectors' may include (A) a parameter showing the number of projectors arranged in a first row, (B) a parameter showing the number of projectors arranged in a second row, (C) a parameter showing the number of projectors arranged in a third row, and (D) a parameter showing the number of projectors arranged in a fourth row, and it is expressed in the form of (A, B, C, D). Accordingly, if three projectors are arranged in one row (three in the first row) on a specific projection surface, a parameter such as (3, 0, 0, 0) can be created, and if five projectors are arranged in two rows (three in the first row/two in the second row) on a specific projection surface, a parameter such as (3, 2, 0, 0) can be created. In addition, if seven projectors are arranged in two rows (four in the first row/three in the second row) on a specific projection surface, a parameter such as (4, 3, 0, 0) can be created The 'parameter showing a material of a projection surface' is a parameter for expressing a material of a projection surface (the main screen, a structure surface or the like). The 'parameter showing a material of a projection surface' may include a parameter symbolizing a unique material of a projection surface or a parameter showing reflectivity or brightness according to a material of a projection surface. In addition, the 'parameter showing a material of a projection surface' can be individually created for each of the plurality of projection surfaces.

The 'parameter showing a color of a projection surface' is a parameter for expressing a color of a projection surface (the main screen, a structure surface or the like). The 'parameter showing a color of a projection surface' may include a parameter showing a red (R) color level of a projection surface, a parameter showing a green (G) color level of a projection surface, a parameter showing a blue (B) color level of a projection surface, a parameter showing a red (R) chromaticity level of a projection surface, a parameter showing a green (G) chromaticity level of a projection surface, a parameter showing a blue (B) chromaticity level of a projection surface and the like. In addition, the 'parameter showing a color of a projection surface' can be individually created for each of the plurality of projection surfaces.

Figure 10:
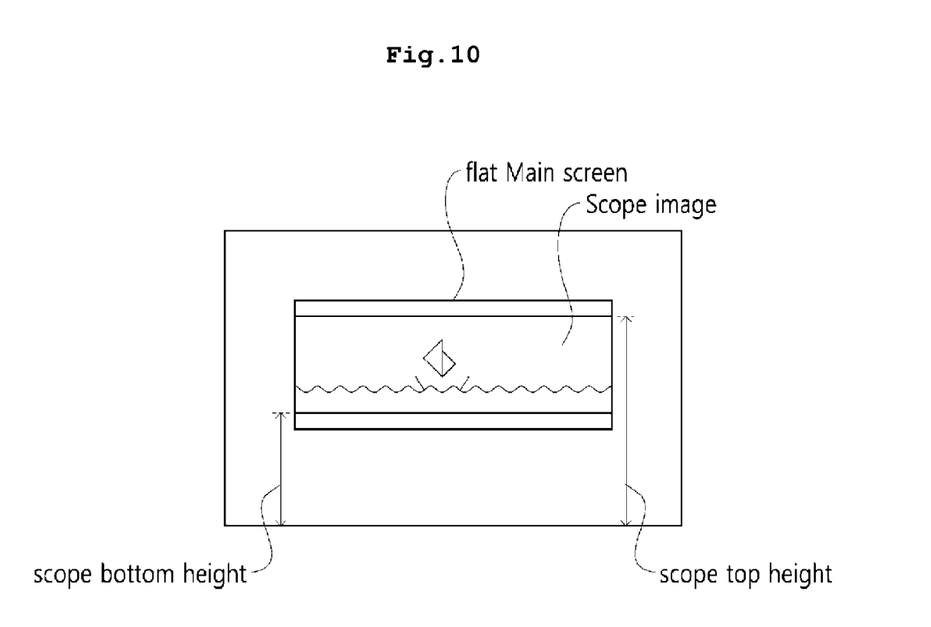

The 'parameter showing a projection position of a scope image' is a parameter showing, in the case where the main screen of a theater is a flat screen (a screen of a ratio of 1.85:1), a position of an image when a scope image (a wide image of a ratio of 2.35:1) is projected on the flat screen. The 'parameter showing a projection position of a scope image' may include, as shown in FIG. 10, a parameter showing a maximum height (scope top height) of the scope image and a parameter showing a minimum height (scope bottom height) of the scope image.

Meanwhile, the parameters described above are merely examples. Accordingly, the present invention may create a variety of parameters which can show the structure and characteristics of a theater in addition to the parameters described above.

In addition, the parameters described above may be utilized in a variety of data processing operations related to the operation of a multi-projection system as described above. For example, the parameters described above may be utilized in a variety of data processing operations including a process of processing an image for each theater or for each projector, a process of simulating a multi-projection system of each theater and the like.

The database 130 is a configuration for storing the parameters created by the parameter creation unit 110.

Figure 6:
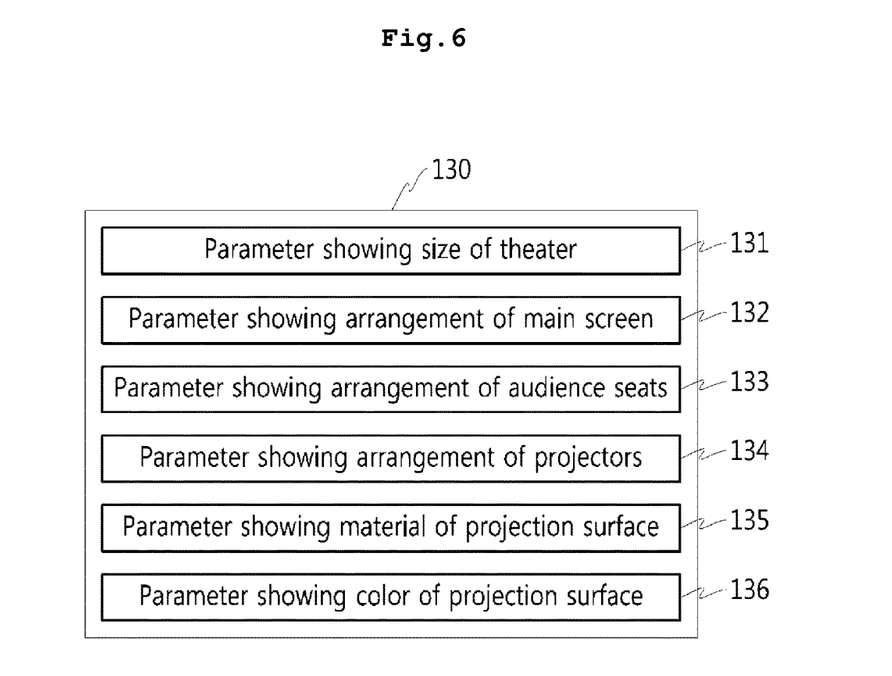
FIG. 6 is a view showing an example of a database that can be included in a theater parameter management apparatus according to an embodiment of the present invention.

As shown in FIG. 6, the database 130 may store a parameter showing a size of a theater 131, a parameter showing arrangement of a main screen 132, a parameter showing arrangement of audience seats 133, a parameter showing arrangement of projectors 134, a parameter showing a material of a projection surface 135, a parameter showing a color of a projection surface 136, a parameter showing a projection position of a scope image and the like, and the database 130 may store various parameters created by the parameter creation unit 110 in addition to these parameters.

In addition, the database 130 may include various types of memory devices capable of storing data and may temporarily or permanently store the parameters.

The data processing unit 150 is a configuration for performing a variety of data processing operations (simulation, image processing and the like) preferably related to the operation of a 'multi-projection system' using the parameters stored in the database 130. For example, the data processing unit 150 may perform a process of creating or correcting images to be played back on a plurality of projection surfaces using the parameters stored in the database 130. In addition, the data processing unit 150 may also perform a process of simulating a view of providing images through the plurality of projection surfaces using the parameters stored in the database 130 and may perform a variety of data processing operations other than these processes.

Hereinafter, representative data processing operations of the data processing unit 150 will be described.

First, when a structure surface is utilized as a projection surface, the data processing unit 150 may correct an image projected on each structure surface using the 'parameter showing a size of a theater 131'. Specifically, the data processing unit 150 may calculate information on the size, the angle and the like of each structure surface by analyzing the 'parameter showing a size of a theater 131' and may correct resolution of the images or perform a warping correction on the images based on the calculated information.

In addition, the data processing unit 150 may correct an image to be projected on the main screen using the 'parameter showing arrangement of a main screen 132'. For example, the data processing unit 150 may calculate information on the size of the main screen, information on the position of the main screen, information on the background area other than the main screen (the area on the front side except the area where the main screen is arranged) and the like by analyzing the 'parameter showing arrangement of a main screen 132', and the data processing unit 150 may correct the size, the ratio and the resolution of an image projected on the main screen based on the calculated information.

On the other hand, in some embodiments, an image can be projected in a 'background area other than the main screen', as well as the 'main screen area', in order to implement a multi-projection environment in which a sense of immersion is maximized. For example, an image can be projected even in the screen top offset area, the screen left offset area, the screen right offset area and the screen bottom offset area (not shown), as well as the main screen area shown in FIG. 8. In this case, the data processing unit 150 may divide a projection surface into a main screen area and a background area other than the main screen using the 'parameter showing arrangement of a main screen 132' and correct images projected on the areas to be different from each other. Specifically, the data processing unit 150 may correct the images projected on the areas to be different from each other considering the characteristics (a color, a material and the like) of the main screen area and the characteristics (a color, a material and the like) of the background area. (For reference, the data processing unit 150 may also use the 'parameter showing a material of a projection surface 135', the 'parameter showing a color of a projection surface 136' and the like together.)

In addition, the data processing unit 150 may correct images to be projected on the left side wall and the right side wall using the 'parameter showing arrangement of audience seats 133'. Specifically, the data processing unit 150 may calculate information on the formation and scale of the audience seats arranged between the projectors and the left side wall and information on the formation and scale of the audience seats arranged between the projectors and the right side wall by analyzing the 'parameter showing arrangement of audience seats 133' and may utilize the calculated information in the masking correction process of the images.

In addition, the data processing unit 150 may correct and distribute an image projected on each projection surface (the main screen, a structure surface or the like) using the 'parameter showing arrangement of projectors 134'. Specifically, the data processing unit 150 may calculate information on a projector arranged for each projection surface using the 'parameter showing arrangement of projectors 134', partition an image to be projected on each projection surface based on the calculated information, and allocate the image to each projector.

In addition, the data processing unit 150 may correct an image projected on each projection surface (the main screen, a structure surface or the like) using the 'parameter showing a material of a projection surface 135'. Specifically, the data processing unit 150 may calculate information on the reflectivity, brightness and the like of each projection surface using the 'parameter showing a material of a projection surface 135' and may correct an image to be projected on each projection surface based on the calculated information.

Meanwhile, in this case, the data processing unit 150 may correct an image of each projection surface considering a relative difference of material among a plurality of projection surfaces. Specifically, the data processing unit 150 may correct an image projected on each projection surface considering a relative difference of material between the main screen and a structure surface (a difference of reflectivity, brightness or the like) or may correct an image projected on each projection surface considering a relative difference of material between the walls (a difference of reflectivity, brightness or the like).

For example, the data processing unit 150 may perform a correction of decreasing brightness of an image on the main screen to offset a brightness difference of 20 nit when the main screen is brighter than the left side wall as much as 20 nit. In addition, the data processing unit 150 may perform a correction of increasing brightness of an image on the right side wall to offset a brightness difference of 10 nit when the right side wall is darker than the left side wall as much as 10 nit and may perform a variety of corrections other than these corrections in order to offset the difference of material.

In addition, the data processing unit 150 may correct an image projected on each projection surface (the main screen, a structure surface or the like) using the 'parameter showing a color of a projection surface 136'. Specifically, the data processing unit 150 may calculate information on a color or chromaticity for each of RGB of each projection surface using the 'parameter showing a color of a projection surface 136' and may correct an image to be projected on each projection surface based on the calculated information.

Meanwhile, in this case, the data processing unit 150 may correct an image of each projection surface considering a relative difference of color or chromaticity among a plurality of projection surfaces. Specifically, the data processing unit 150 may correct an image projected on each projection surface considering a relative difference of color or chromaticity between the main screen and a structure surface or may correct an image projected on each projection surface considering a relative difference of color or chromaticity between the walls.

For example, the data processing unit 150 may perform a correction of decreasing the R (red) chromaticity level of an image on the main screen to offset a chromaticity difference of 70 levels when the R chromaticity level of the main screen is higher than the R chromaticity level of left side surface as much as 70 levels. In addition, the data processing unit 150 may perform a correction of increasing the B (blue) chromaticity level of an image on the right side surface to offset a chromaticity difference of 10 levels when the B chromaticity level of the right side surface is lower than the B chromaticity level of left side surface as much as 10 levels and may perform a variety of corrections other than these corrections in order to offset a difference of color or chromaticity.

In addition, the data processing unit 150 may correct an image projected on the main screen constructed in the form of a flat screen using the 'parameter showing a projection position of a scope image'. Specifically, the data processing unit 150 may correct a size of a scope image using the 'parameter showing a projection position of a scope image' and may perform a control action so that the corrected image can be projected at a predetermined position of the main screen. In addition, the data processing unit 150 may recognize a background area on which the scope image is not projected among the entire area of the main screen and may insert an additional image (a caption image or the like) in a corresponding background area.

Meanwhile, the data processing unit 150 may perform a variety of data processing operations related to the operation of the multi-projection system in addition to the examples described above.

The communication unit 170 is a configuration for transmitting and receiving data to and from a variety of electronic devices. The theater parameter management apparatus 100 may transmit and receive data to and from the input device or a variety of external electronic devices through the communication unit 170.

Meanwhile, the communication unit 170 may be implemented in a variety of forms capable of transmitting and receiving data wiredly or wirelessly and may be controlled by the data processing unit 150.

Hereinafter, a theater parameter management method according to an embodiment of the present invention will be described.

First, the theater parameter management method according to an embodiment of the present invention may include a step (step a) of receiving information related to the structure of a theater by the theater parameter management apparatus.

In addition, the theater parameter management method may further include, after step a, a step (step b) of creating parameters showing the structure of the theater based on the input information by the theater parameter management apparatus.

In addition, the theater parameter management method may further include, after step b, a step (step c) of storing the created parameters by the theater parameter management apparatus.

In addition, the theater parameter management method may further include, after step c, a step (step d) of performing a data processing using the stored parameters by the theater parameter management apparatus.

Meanwhile, after being implemented in the form of a program, the theater parameter management method can be stored in a recoding medium that can be read by an electronic device or transmitted and received through a communication network. In addition, the theater parameter management method can be stored temporarily or permanently in a variety of electronic devices after being implemented in the form of a program.

Although its category is different, the theater parameter management method may include features practically the same as those of the theater parameter management apparatus according to an embodiment of the present invention. Accordingly, the features described above in relation to the theater parameter management apparatus may be easily inferred and applied to the theater parameter management method.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A theater parameter management apparatus comprising:
a parameter creation unit configured to create parameters showing a structure of a theater based on input information;
a database configured to store the parameters created by the parameter creation unit; and
a data processing unit configured to perform a data processing using the parameters stored in the database.

2. The apparatus according to claim 1, wherein the theater is a multi-projection theater having a plurality of projection surfaces for providing images through the plurality of projection surfaces, and
the data processing unit is configured to create or correct the images to be played back on the plurality of projection surfaces using the parameters stored in the database.

3. The apparatus according to claim 1, wherein
the theater is a multi-projection theater having a plurality of projection surfaces for providing images through the plurality of projection surfaces, and
the data processing unit is configured to process, based on the parameters stored in the database, a simulation of a view of providing the images on the plurality of projection surfaces of the theater.

4. The apparatus according to claim 2, wherein the plurality of projection surfaces includes a main screen and structure surfaces.

5. The apparatus according to claim 1, wherein the parameter creation unit is configured to create a parameter showing a size of the theater, a parameter showing arrangement of a main screen, a parameter showing arrangement of audience seats, or a parameter showing arrangement of projectors.

6. The apparatus according to claim 5, wherein
the parameter creation unit is configured to create the parameter showing a size of the theater, and
the created parameter showing a size of the theater includes a parameter showing a width of the theater, a parameter showing a height of the theater, and a parameter showing a depth of the theater.

7. The apparatus according to claim 5, wherein
the parameter creation unit is configured to create the parameter showing arrangement of a main screen, and
the created parameter showing arrangement of a main screen includes a parameter showing a ratio of the main screen, a parameter showing a screen top offset of the main screen, a parameter showing a screen left offset of the main screen, and a parameter showing a screen right offset of the main screen.

8. The apparatus according to claim 5, wherein
the parameter creation unit is configured to create the parameter showing arrangement of audience seats, and
the created parameter showing arrangement of audience seats includes a parameter showing a front depth of the audience seats, a parameter showing a rear depth of the audience seats, and a parameter showing a rear height of the audience seats.

9. The apparatus according to claim 5, wherein
the parameter creation unit is configured to create the parameter showing arrangement of the projectors, and
the created parameter showing arrangement of the projectors includes a parameter showing the number of projectors arranged in a first row, a parameter showing the number of projectors arranged in a second row, a parameter showing the number of projectors arranged in a third row, and a parameter showing the number of projectors arranged in a fourth row.

10. The apparatus according to claim 1, wherein the parameter creation unit is configured to create parameters showing a material or a color of a projection surface.

11. The apparatus according to claim 10, wherein the data processing unit is configured to correct an image projected on a main screen or an image projected on a structure surface considering information on difference of color or difference of material between the main screen and the structure surface.

12. The apparatus according to claim 10, wherein the data processing unit is configured to correct images projected on structure surfaces considering difference of color or difference of material between the structure surfaces.

13. The apparatus according to claim 1, wherein the input information is information from a scanner, information from a camera or information from an input device.

14. The apparatus according to claim 1, wherein the input information is information on a physical structure of the theater and obtained from a scanner scanning the physical structure of the theater using laser, X-ray, white light or infrared light.

15. A theater parameter management method comprising the steps of:
   (a) receiving information related to a structure of a theater by a theater parameter management apparatus;
   (b) creating parameters showing the structure of the theater based on the input information by the theater parameter management apparatus;
   (c) storing the created parameters by the theater parameter management apparatus; and
   (d) performing a data processing using the stored parameters by the theater parameter management apparatus.

16. The apparatus according to claim 3, wherein the plurality of projection surfaces includes a main screen and structure surfaces.

17. A theater parameter management apparatus, comprising:
   a parameter creation unit for creating parameters showing a structure of a theater based on input information;
   a database for storing the parameters created by the parameter creation unit; and
   a data processing unit for performing a data processing using the parameters stored in the database,
   wherein the parameter creation unit creates
      parameters showing a size of the theater, wherein the parameters showing the size of the theater include a parameter showing a width of the theater, a parameter showing a height of the theater, and a parameter showing a depth of the theater,
      parameters showing arrangement of a main screen, wherein the parameters showing the arrangement of the main screen include a parameter showing a ratio of the main screen, a parameter showing a screen top offset of the main screen, a parameter showing a screen left offset of the main screen, and a parameter showing a screen right offset of the main screen,
      parameters showing arrangement of audience seats, wherein the parameters showing the arrangement of the audience seats include a parameter showing a front depth of the audience seats, a parameter showing a rear depth of the audience seats, and a parameter showing a rear height of the audience seats, or
      parameters showing arrangement of projectors, wherein the parameters showing the arrangement of the projectors include a parameter showing the number of projectors arranged in a first row, a parameter showing the number of projectors arranged in a second row, a parameter showing the number of projectors arranged in a third row, and a parameter showing the number of projectors arranged in a fourth row.

* * * * *